(12) United States Patent
Zhao et al.

(10) Patent No.: US 12,323,581 B2
(45) Date of Patent: Jun. 3, 2025

(54) ANGULAR INTRA PREDICTION

(71) Applicant: Tencent America LLC, Palo Alto, CA (US)

(72) Inventors: Liang Zhao, Sunnyvale, CA (US); Xin Zhao, Santa Clara, CA (US); Jing Ye, San Jose, CA (US); Han Gao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 56 days.

(21) Appl. No.: 18/215,321

(22) Filed: Jun. 28, 2023

(65) Prior Publication Data

US 2024/0298022 A1 Sep. 5, 2024

Related U.S. Application Data

(60) Provisional application No. 63/449,281, filed on Mar. 1, 2023.

(51) Int. Cl.
| | |
|---|---|
| *H04N 19/105* | (2014.01) |
| *H04N 19/132* | (2014.01) |
| *H04N 19/159* | (2014.01) |
| *H04N 19/176* | (2014.01) |
| *H04N 19/44* | (2014.01) |

(52) U.S. Cl.
CPC ......... *H04N 19/105* (2014.11); *H04N 19/132* (2014.11); *H04N 19/159* (2014.11); *H04N 19/176* (2014.11); *H04N 19/44* (2014.11)

(58) Field of Classification Search
CPC .. H04N 19/105; H04N 19/132; H04N 19/159; H04N 19/176; H04N 19/44; H04N 19/11; H04N 19/186; H04N 19/593

USPC ...................................................... 375/240.25
See application file for complete search history.

(56) References Cited

U.S. PATENT DOCUMENTS

| | | | |
|---|---|---|---|
| 11,627,312 B2 | 4/2023 | Yu et al. | |
| 2014/0192891 A1* | 7/2014 | Alshina | H04N 19/117 375/240.24 |
| 2021/0227213 A1* | 7/2021 | Kim | H04N 19/11 |

(Continued)

OTHER PUBLICATIONS

M. Guo, et al., "Intra Bi-Prediction (IBP)," Alliance for Open Media, Codec Working Group, CWG-B056, Jun. 24, 2021, pp. 1-7.

(Continued)

*Primary Examiner* — Matthew K Kwan
(74) *Attorney, Agent, or Firm* — ArentFox Schiff LLP

(57) ABSTRACT

Coded information of a current block and a plurality of reference lines of the current block is received. A first offset value is determined in a first mapping table and associated with a first reference line of the plurality of reference lines that is adjacent to the current block. A second offset value is determined in a second mapping table and associated with a second reference line of the plurality of reference lines that is adjacent to the first reference line. A first reference sample for a sample of the current block is determined from the first reference line based on the first offset value. A second reference sample for the sample of the current block is determined from the second reference line based on the second offset value. The sample of the current block is reconstructed based on one of the first reference sample and the second reference sample.

20 Claims, 11 Drawing Sheets

(56) References Cited

U.S. PATENT DOCUMENTS

| | | | |
|---|---|---|---|
| 2022/0109846 A1* | 4/2022 | Lim | H04N 19/136 |
| 2023/0231992 A1* | 7/2023 | Chen | H04N 19/537 |
| | | | 375/240.02 |

OTHER PUBLICATIONS

Rivaz et al., AV1 Bitstream & Decoding Process Specification The Alliance for Open Media 681, Jan. 8, 2019, pp. 1-681.

Chen et al., An Overview of Core Coding Tools in the AV1 Video Codec, 2018 Picture Coding Symposium (PCS), San Francisco, CA, USA, 2018, pp. 41-45.

Zhao, X. Zhao, S. Liu, X. Li, J. Lainema, G. Rath, F. Urban, F. Racape, "Wide Angular Intra Prediction for Versatile Video Coding," 2019 Data Compression Conference (DCC), Snowbird, UT, USA, 2019, pp. 53-62.

Y.-J. Chang, H.-J. Jhu, H.-Y. Jian, L. Zhao, X. Zhao, X. Li, S. Liu, B. Bross, p. Keydel, H. Schwarz, D. Marpe, and T. Wiegand, "Intra prediction using multiple reference lines for the versatile video coding standard," Proc. SPIE 11137, Applications of Digital Image Processing XLII, 1113716, Sep. 2019, pp. 1-8.

Zhao, X. Zhao, and S. Liu, "Improved Intra Coding Beyond AV1 Using Adaptive Prediction Angles and Reference Lines," IEEE International Conference on Image Processing (ICIP), Abu Dhabi, United Arab Emirates, Sep. 2020, pp. 1-5.

Yize Jin, Liang Zhao, Xin Zhao, Shan Liu, Alan. C. Bovik, "Improved Intra Mode Coding Beyond Av1", Acoustics Speech and Signal Processing (ICASSP) ICASSP 2021—2021 IEEE International Conference on, pp. 1580-1584, 2021, pp. 1-5.

Mohammed Golam Sarwer, and Yan Ye, "Offset based refinement for intra prediction (ORIP)," Alliance for Open Media, Codec Working Group, CWG-B019, 2021, pp. 1-9.

International Search Report issued in Application No. PCT/US2023/069322, mailed Nov. 20, 2023, 8 pages.

* cited by examiner

```
static const int16_t dr_intra_derivative[90] = {
  // More evenly spread out angles and limited to 10-bit
  // Values that are 0 will never be used
  //                      Approx angle
  0,    0, 0,       //
  1023, 0, 0,       // 3,  ...
  547,  0, 0,       // 6,  ...
  372,  0, 0, 0, 0, // 9,  ...
  273,  0, 0,       // 14, ...
  215,  0, 0,       // 17, ...
  178,  0, 0,       // 20, ...
  151,  0, 0,       // 23, ... (113 & 203 are base angles)
  132,  0, 0,       // 26, ...
  116,  0, 0,       // 29, ...
  102,  0, 0, 0,    // 32, ...
  90,   0, 0,       // 36, ...
  80,   0, 0,       // 39, ...
  71,   0, 0,       // 42, ...
  64,   0, 0,       // 45, ... (45 & 135 are base angles)
  57,   0, 0,       // 48, ...
  51,   0, 0,       // 51, ...
  45,   0, 0, 0,    // 54, ...
  40,   0, 0,       // 58, ...
  35,   0, 0,       // 61, ...
  31,   0, 0,       // 64, ...
  27,   0, 0,       // 67, ... (67 & 157 are base angles)
  23,   0, 0,       // 70, ...
  19,   0, 0,       // 73, ...
  15,   0, 0, 0, 0, // 76, ...
  11,   0, 0,       // 81, ...
  7,    0, 0,       // 84, ...
  3,    0, 0,       // 87, ...
};
```

FIG. 5

ANGULAR INTRA PREDICTION

INCORPORATION BY REFERENCE

The present application claims the benefit of priority to U.S. Provisional Application No. 63/449,281, "Angular Intra Prediction" filed on Mar. 1, 2023, which is incorporated by reference herein in its entirety.

TECHNICAL FIELD

The present disclosure includes embodiments related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and apparatuses for video encoding/decoding. In some examples, an apparatus for video decoding includes receiving circuitry and processing circuitry.

According to an aspect of the disclosure, a method of video decoding performed in a video decoder is provided. In the method, coded information of a current block and a plurality of reference lines of the current block is received from a coded video bitstream. Each of the plurality of reference lines includes a respective row of reference samples above a top side of the current block and a respective column of reference samples at a left side of the current block. A first offset value is determined in a first angle-to-offset mapping table. The first offset value is associated with a first directional mode of the current block and a first reference line of the plurality of reference lines that is adjacent to the current block. A second offset value is determined in a second angle-to-offset mapping table that is different from the first angle-to-offset mapping table. The second offset value is associated with a second directional mode of the current block and a second reference line of the plurality of reference lines that is adjacent to the first reference line. A first reference sample for a sample of the current block is determined from the first reference line based on the first offset value. A second reference sample for the sample of the current block is determined from the second reference line based on the second offset value. The sample of the current block is reconstructed based on one of the first reference sample and the second reference sample.

In an example, the first angle-to-offset mapping table indicates correlations between candidate directional modes and offset values that are associated with the current block and the first reference line. The second angle-to-offset mapping table indicates correlations between candidate directional modes and offset values that are associated with the current block and the second reference line.

In an example, the first reference sample is determined from the reference samples of the first reference line based on a first directional angle. The first directional angle is equal to a sum of the first directional mode of the current block and the first offset value. The second reference sample is determined from the reference samples of the second reference line based on a second directional angle. The second directional angle is equal to a sum of the second directional mode of the current block and the second offset value.

In an example, based on the first directional mode and the second directional mode of the current block being larger than 45 degrees, a difference of the first offset value and the second offset value is within a preset range.

In some embodiments, the first directional mode associated with the current block and the first reference line, and the second directional mode associated with the current block and the second reference line correspond to a same offset value.

In an embodiment, a first difference between the first directional mode and the same offset value, a second difference between the second directional mode and the same offset value, and a third difference between the first directional mode and the second directional mode are within a predefined range.

In an embodiment, an offset value for a chroma component of the current block is determined based on a reference line of the plurality of reference lines that is associated with a luma component of the current block.

In an example, the predefined range is equal to or larger than the first offset value minus a constant value, and equal to or smaller than the first offset value plus the constant value.

In an example, the constant value is one of 1, 2, 3, or 4.

According to another aspect of the disclosure, an apparatus is provided. The apparatus includes processing circuitry. The processing circuitry can be configured to perform any of the described methods for video decoding/encoding.

Aspects of the disclosure also provide a non-transitory computer-readable medium storing instructions which when executed by a computer for video decoding cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 5 is a schematic illustration of an exemplary angle-to-offset look-up table according to some embodiments of the disclosure.

DETAILED DESCRIPTION OF EMBODIMENTS

Figure 1:
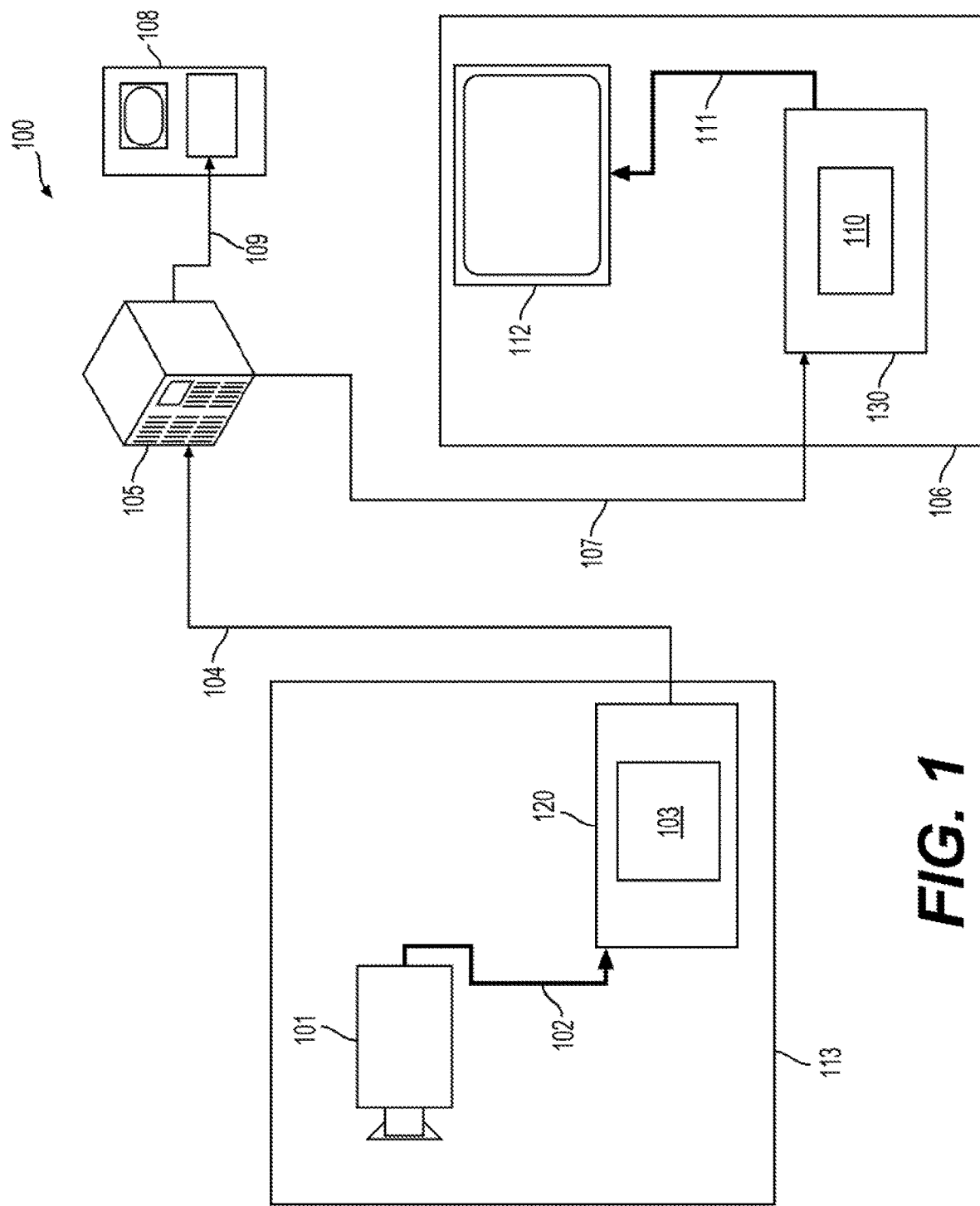
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other image and video enabled applications, including, for example, video conferencing, digital TV, streaming services, storing of compressed video on digital media including CD, DVD, memory stick and the like.

The video processing system (100) includes a capture subsystem (113), that can include a video source (101). The video source (101) can include one or more images captured by a camera and/or generated by a computer. For example a digital camera creates a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
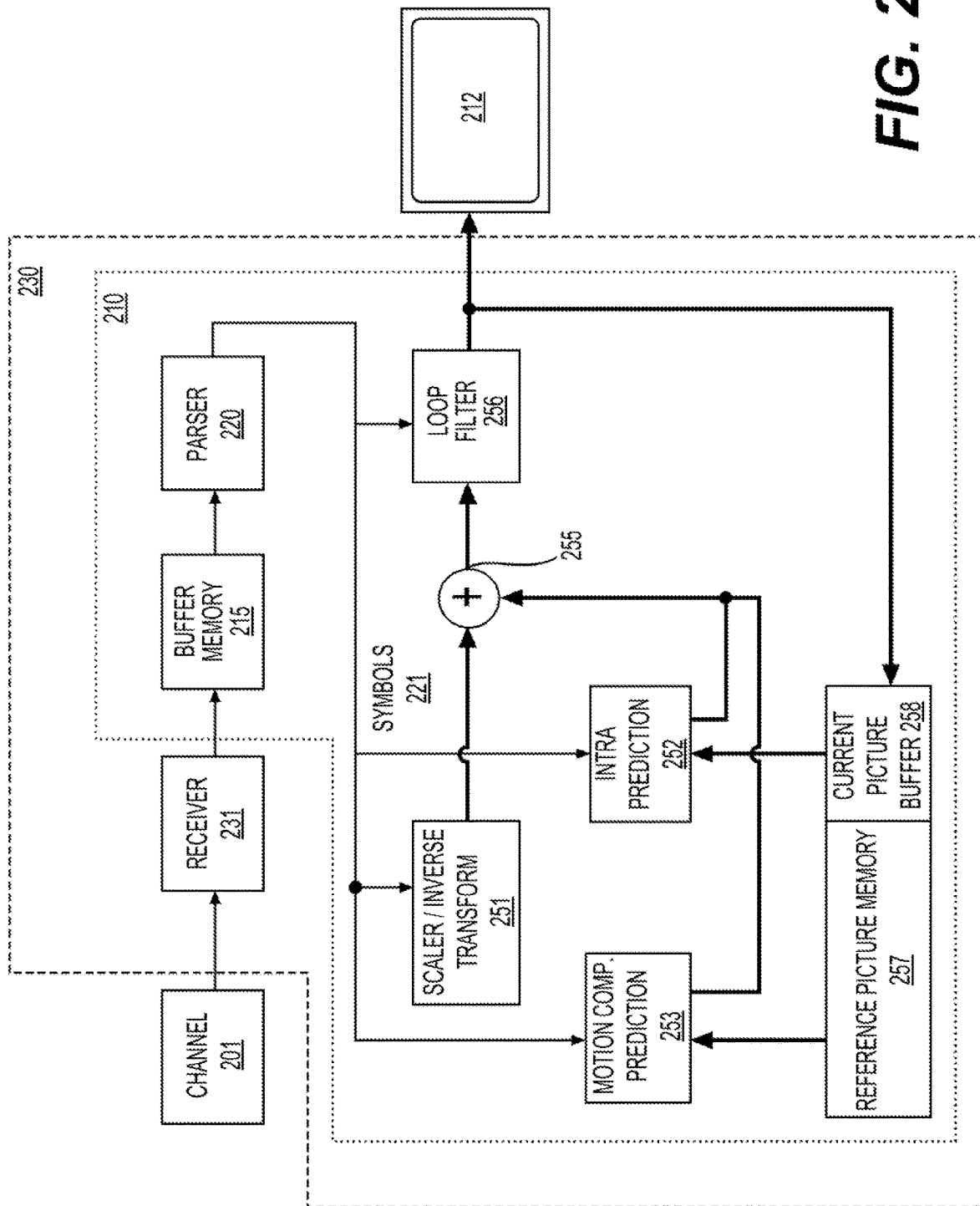
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231). The receiver (231) may include receiving circuitry, such as network interface circuitry. The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc., as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
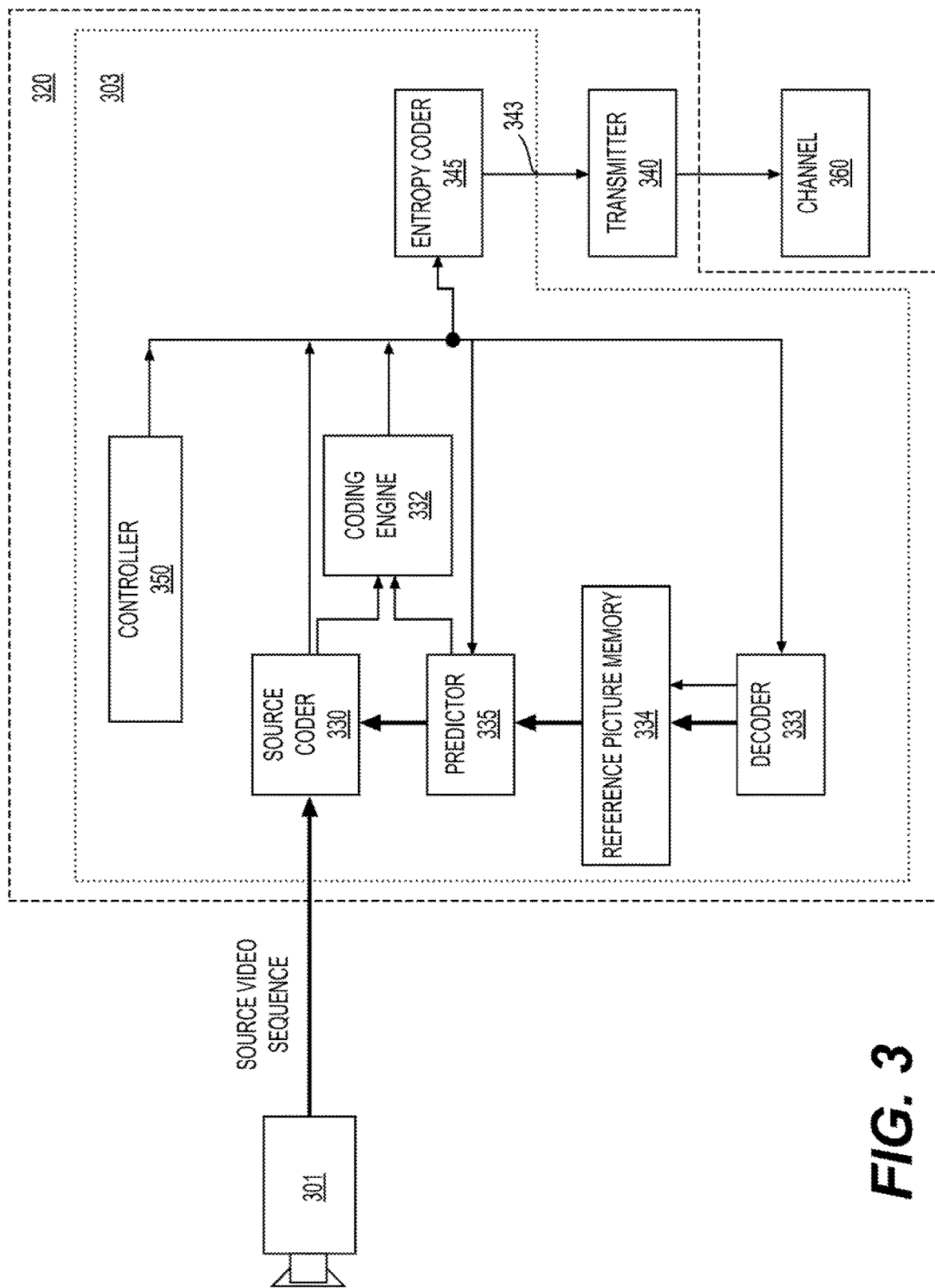
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc., in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, etc.), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks, such as a polygon-shaped or triangular block. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

The disclosure includes embodiments related to advanced video coding technologies, such as an improved angular intra prediction method.

AOMedia Video 1 (AV1) is an open video coding format designed for video transmissions over an internet. AV1 was developed as a successor to VP9 by an alliance for Open Media (AOMedia), which is a consortium founded in 2015 that includes semiconductor firms, video on demand providers, video content producers, software development companies and web browser vendors. Many of components of the AV1 project were sourced from previous research efforts by alliance members. Individual contributors started experimental technology platforms years before. For example, Xiph's/Mozilla's Daala already was published code in 2010, Google's experimental VP9 evolution project VP10 was announced on Sep. 12, 2014, and Cisco's Thor was published on Aug. 11, 2015. Building on the codebase of VP9, AV1 incorporates additional techniques, where several of the additional techniques were developed in the above experimental formats. A first version 0.1.0 of the AV1 reference codec was published on Apr. 7, 2016. The alliance announced the release of the AV1 bitstream specification on Mar. 28, 2018, along with a reference, software-based encoder, and decoder. On Jun. 25, 2018, a validated version 1.0.0 of the specification was released. On Jan. 8, 2019, a validated version 1.0.0 with Errata 1 of the specification was released. The AV1 bitstream specification includes a reference video codec.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, the two standard organizations jointly formed JVET (Joint Video Exploration Team) to explore the potential of developing the next video coding standard beyond HEVC. In October 2017, the two standard organizations issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

Figure 4:
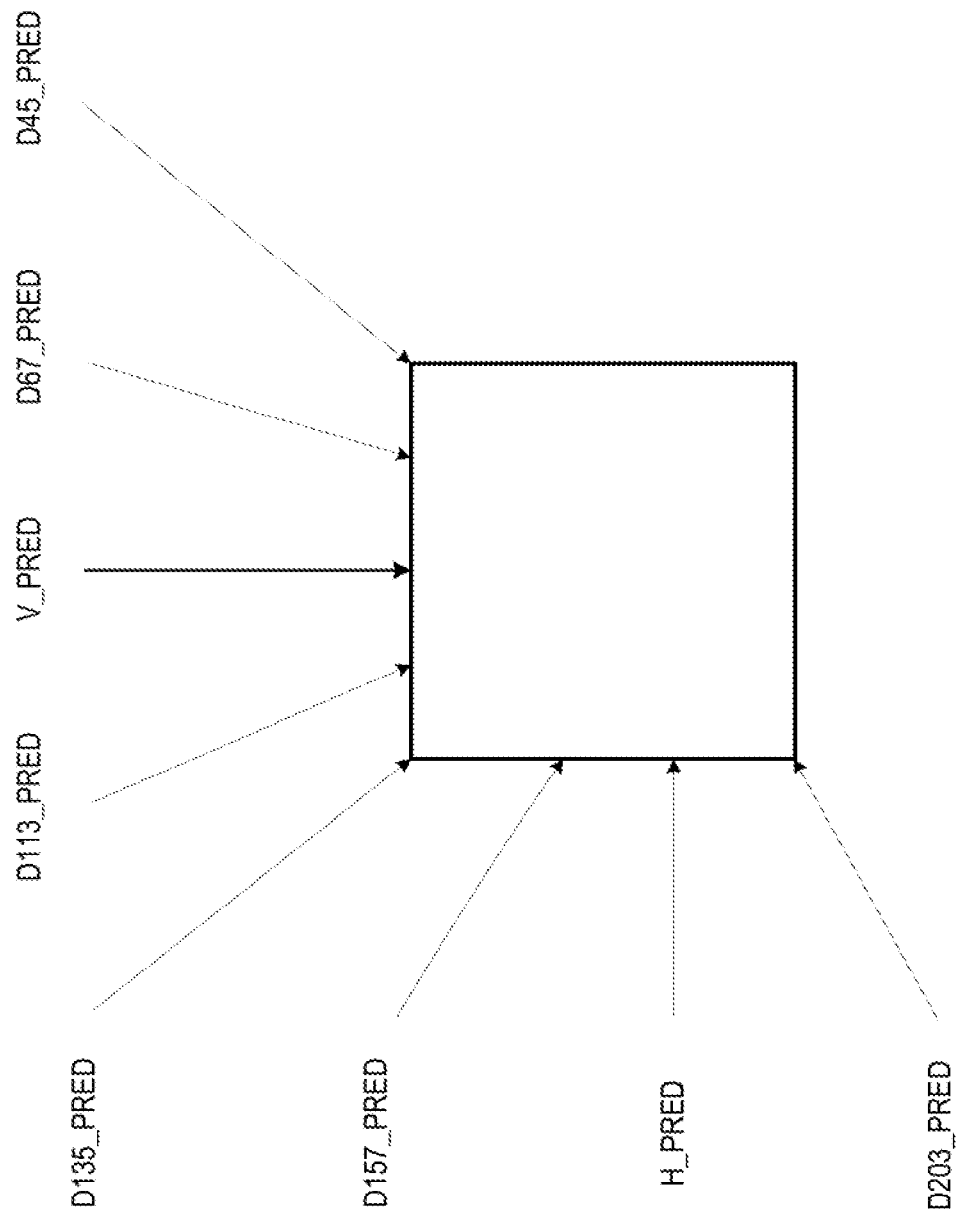
FIG. 4 is a schematic illustration of exemplary nominal angles in AOMedia Video (AV1) according to some embodiments of the disclosure.

In an example of directional intra prediction in AV1, VP9 can support 8 directional modes corresponding to angles from 45 to 207 degrees. To exploit more varieties of spatial redundancy in directional textures, such as in AV1, directional intra modes are extended to an angle set with finer granularity. The original 8 directional angles are slightly changed and made as nominal angles, and these 8 nominal angles are named as V_PRED, H_PRED, D45_PRED, D135_PRED, D113_PRED, D157_PRED, D203_PRED, and D67_PRED, which can be illustrated in FIG. 4. For each nominal angle, it can have 7 finer angles. Thus, AV1 has 56 directional angles in total. A prediction angle can be presented by a nominal intra angle plus an angle delta, which is—3~3 multiplies a step size of 3 degrees. To implement directional prediction modes in AV1 via a generic way, all the 56 directional intra prediction modes (or 56 directional angles) in AV1 can be implemented with a unified directional predictor that projects each pixel to a reference sub-pixel location and interpolates the reference pixel by a 2-tap bilinear filter. The directional intra prediction in AV1 can also be called a single directional intra prediction.

A look-up table (or angle-to-offset mapping table) can be used to map each intra prediction angle to horizontal and vertical offsets between each pixel in a current block and a reference sample of the respective pixel in the current block. An exemplary angle-to-offset mapping table (500) in AV1 can be illustrated in FIG. 5. As shown in FIG. 5, the table (500) includes a plurality of intra prediction angles (or Approx angles) (502) that correspond to a plurality of offsets (504). Each of offsets in the table (500) can be determined based on an integer value of tangent ( ) multiplied by 64 for each intra prediction angle. For example, an offset 64 that corresponds to an intra prediction angle 45° C. an be determined as equal to tangent(45°) multiplied by 64, where) tangent(45° is equal to 1. In another example, when an intra prediction angle is 87°, a complementary angle of 87° is 3°. Thus, an offset corresponding to 87° is equal to tangent (3°) multiplied by 64, which can be 3. In some embodiments, an associated offset can be 64 for a 45° intra prediction angle, and a horizontal offset between each pixel in the current block and a corresponding reference pixel can be increased by 1 pixel as a row number of the respective pixel increases by 1.

Chroma from Luma (CfL) is a chroma-only intra predictor that models chroma pixels as a linear function of coincident reconstructed luma pixels. The CfL prediction for a chroma component of a block can be expressed as follows in equation (1):

$$CfL(\alpha) = \alpha \times L_{AC} + DC \qquad \text{Eq. (1)}$$

where $L_{AC}$ can denote an AC contribution of a luma component of the block, a can denote a parameter of the linear model, and DC can denote a DC contribution of the chroma component. In an example, reconstructed luma pixels can be subsampled into a chroma resolution, and then an average value can be subtracted to form the AC contribution. To approximate a chroma AC component from the AC contribution, instead of requiring a decoder to calculate scaling parameters such as in some related examples, AV1 CfL can determine the parameter a based on original chroma pixels and signals the original chroma pixels in the bitstream. Accordingly, a decoder complexity can be reduced, and more precise predictions can be yielded. As for the DC contribution of the chroma component, the DC contribution can be computed using an intra DC mode. The intra DC mode can be suitable for most chroma contents and have mature fast implementations.

Figure 6:
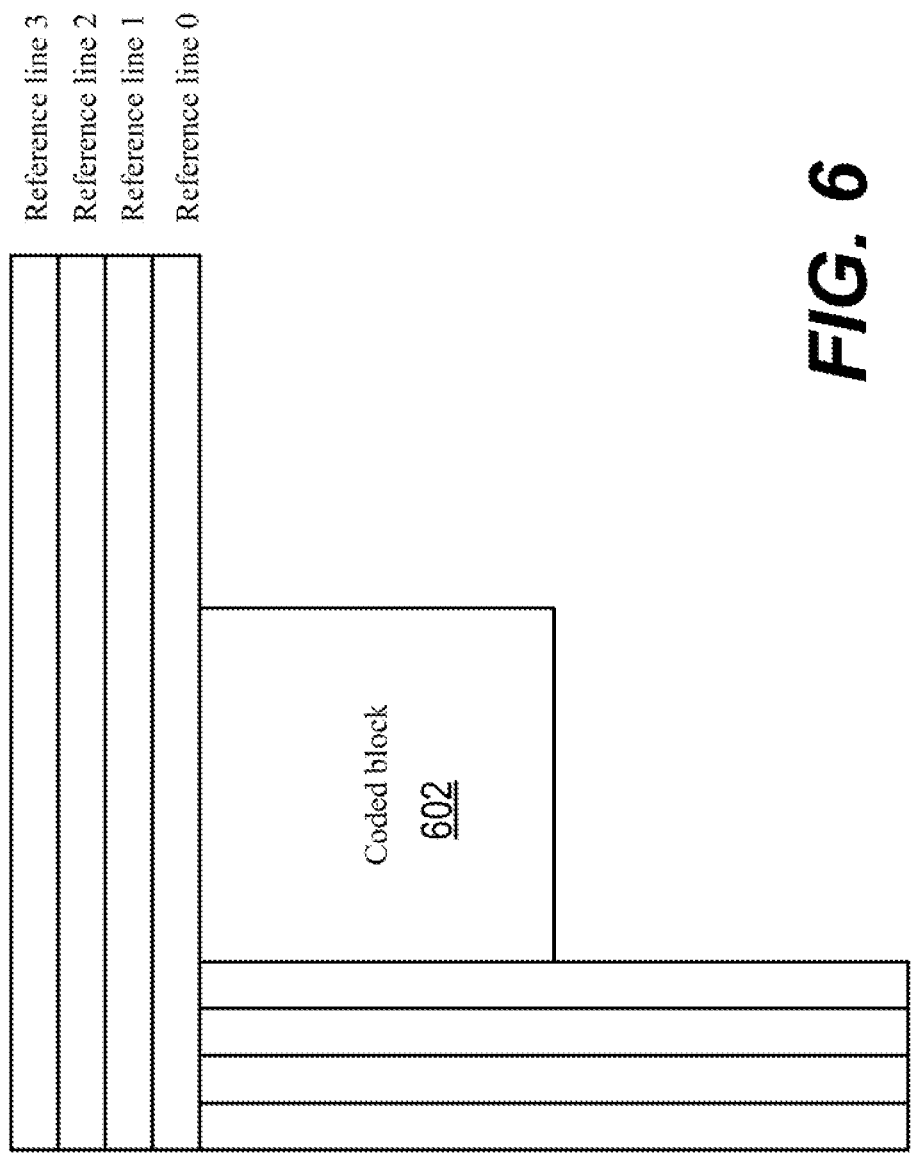
FIG. 6 is a schematic illustration of an example multiple reference line selection (MRLS) for intra prediction according to some embodiments of the disclosure.

Multiple reference line selection (also referred to as multiple reference line prediction (MRLP)) for intra prediction was proposed to use farther reference lines for the intra prediction, and an encoder can decide, and signal which reference line is used to generate the intra predictor. For example, a reference line index can be signaled to indicate which reference line is applied. At a decoder side, after parsing the reference line index, the intra prediction of a current block can be generated by using reconstructed samples in the reference line indicated by the reference index. The reference line index can be signaled in a coded block level, and one of the multiple reference lines can accordingly be used for intra prediction of one coded block. In some embodiments, MRLS can be applied to a luma component of a block and may not be applied to a chroma component of the block. An exemplary MRLS can be shown in FIG. 6. As shown in FIG. 6, 4 reference lines (or candidate reference lines) 1-4 can be available for a coded block (602) for intra prediction. One of the 4 candidate reference lines can be selected to intra predict the coded block (602). An intra prediction of the coded block (602) can be generated by using reconstructed samples in the selected reference line.

Figure 7:
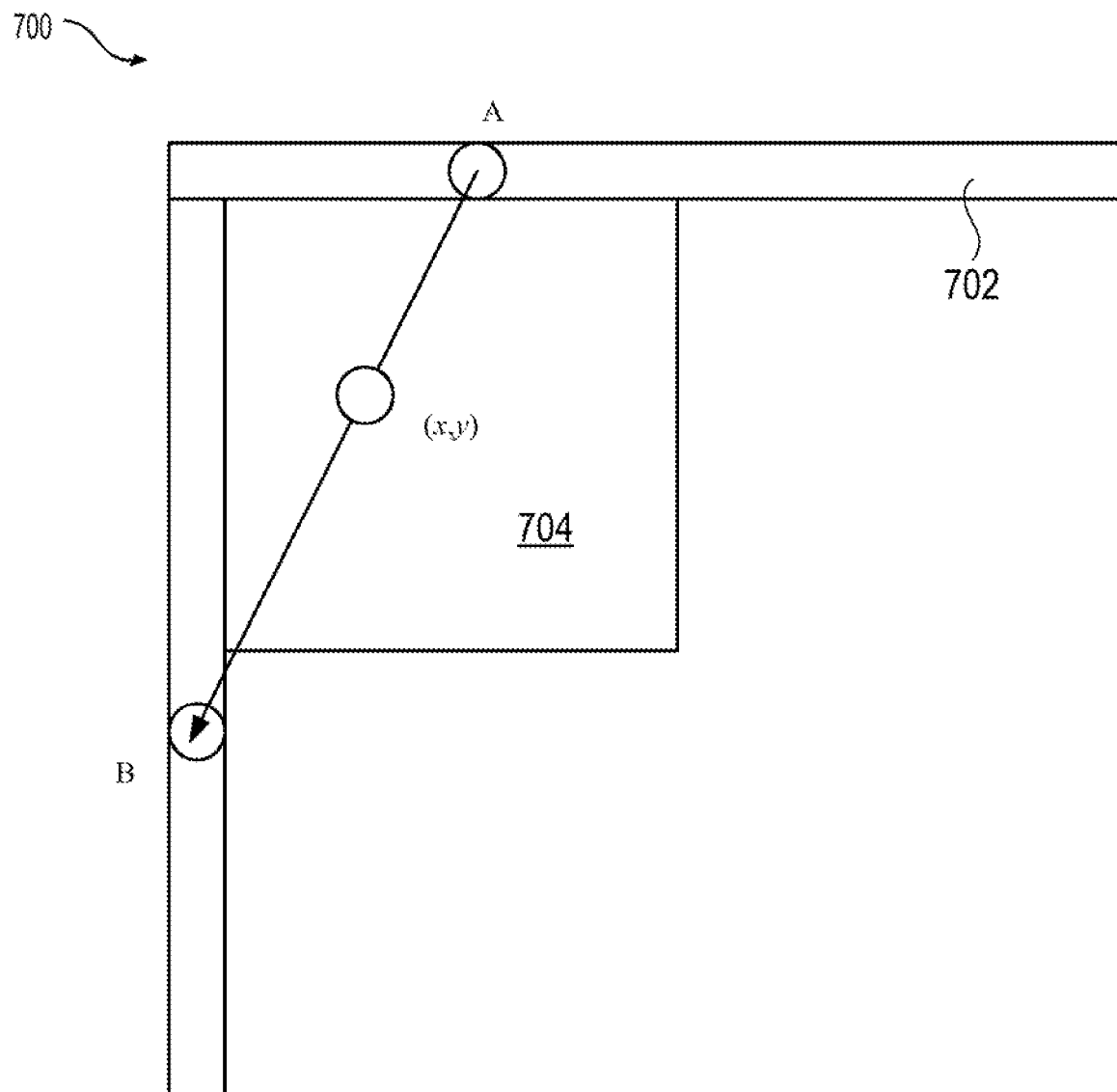
FIG. 7 is a schematic illustration of a first example of intra bi-prediction according to some embodiments of the disclosure.
Figure 8:
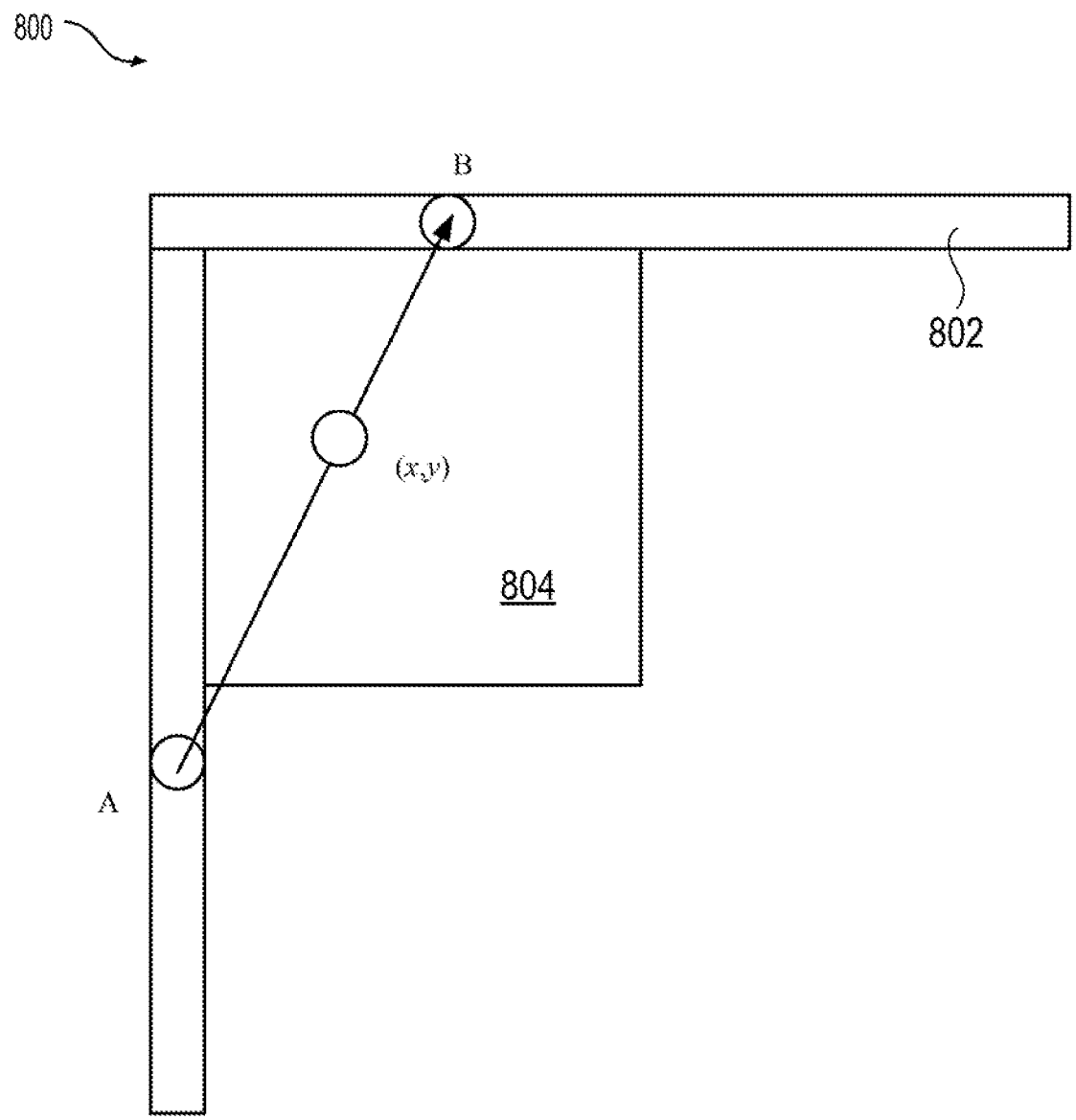
FIG. 8 is a schematic illustration of a second example of intra bi-prediction according to some embodiments of the disclosure.

In a related standard, such as CWG-B056, an Intra Bi-Prediction (IBP) method can be provided. The IBP can determine two reference pixels along a prediction direction, and the two reference pixels can be combined to achieve a directional predictor. IBP can be applied to directional modes (or directional intra prediction modes) that are in a predefined range, such as in a range that is smaller than 90 degrees or larger than 180 degrees. For a directional mode, if IBP is applied, two reference pixels along a direction or the directional mode can be weighted and combined to achieve the directional predictor. FIG. 7 shows a first example (700) of IBP and FIG. 8 shows a second example (800) of IBP. In both the first example and the second example, a prediction direction from A (or a reference sample A) to B (or a reference sample B) in a reference line (e.g., (702) or (802)) is provided. A prediction for a pixel (x, y) (denoted as pred (x, y)) in a block (e.g., (704) or (804)) can be generated with a weighted combination of the two predictors A and B. The prediction pred (x, y) can be shown in equation (2) as follows:

$$pred(x, y) = w*A + (1-w)*B \qquad \text{Eq. (2)}$$

where w is a weight factor, A and B can be derived based on a directional prediction process, such as in AV1 (or AV2), which includes interpolation for a fractional-pixel reference.

In related examples, Intra Bi-Prediction can be applied when directional modes are smaller than 90 degrees or larger than 180 degrees. However, the application of IBP in an angle range that is smaller than 90 degrees or larger than 180 degrees may not be optimal for a video content with sharp edges, such as a screen content.

Further, in related examples, same intra prediction angles are provided for all candidate reference lines. However, by providing different intra prediction angles for different reference lines, an encoder can gain more options to determine a directional predictor.

In the disclosure, proposed methods can be used separately or combined in any order. Further, if a mode is not a smooth mode, or a mode generates prediction samples according to a given prediction direction, the mode can be called a directional mode.

In the disclosure, Intra Bi-Prediction may be applied to directional modes with certain delta angles. For example, whether to apply IBP can be determined based on a value of a delta angle. If the value of the delta angle is equal to a certain value, then IBP can be applied. Otherwise, a single directional intra prediction can be applied. According to the single direction intra prediction, a prediction value of a sample in a current block can be determined based on a reference sample in a reference line of the current block.

In an embodiment, when a directional mode of a current block is in an angle range, such as smaller than 90 degrees or larger than 180 degrees, and an adjacent reference line is used for intra prediction (e.g., the adjacent reference line includes reference samples for intra prediction), Intra Bi-Prediction can be applied to the directional mode with a delta angle equal to a constant, such as 0 and/or +/−2. Thus, in an example, when a value of a delta angle associated with the directional mode of the current block is 0, 2, or −2, IBP can be applied. In another example, when the value of the delta angle associated with the directional mode of the current block is in a range from 0 to 2 or in a range from −2 to 2, IBP can be applied. Accordingly, a directional angle of the IBP can be equal to a sum of the directional mode of the current block and the delta angle. As shown in FIGS. 7-8, a prediction value of a sample in the current block can be determined based on a weighted combination of two reference samples in a reference line of the current block, where the two reference samples are indicated by the directional angle of the IBP.

Otherwise, when the directional mode is smaller than 90 degrees or larger than 180 degrees and the adjacent reference line is used for intra prediction, a single directional intra prediction can be applied to the directional mode with the delta angle not equal to +/−2 and/or 0. In an example, the delta angle can be included in a coded bitstream that is signaled to a decoder.

In an embodiment, when a directional mode of a current block is smaller than 90 degrees or larger than 180 degrees, Intra Bi-Prediction may be applied to the directional mode with a certain pre-defined delta angle. Thus, if the delta angle is equal to the pre-defined delta angle (or pre-defined value), IBP can be applied. The predefined delta angle can be signaled at a sequence level, a frame level, a slice level, or any other suitable high-level syntax.

In an embodiment, IBP may be applied to a subset of directional intra prediction modes, where the directional intra prediction modes can be associated with prediction angles less than 90 degrees or greater than 180 degrees. In an example, IBP can be applied for an intra prediction mode with an even (or an odd) index value. For example, for intra prediction angles less than 90 degree and greater than 180, an intra prediction mode index for each intra prediction angle can be denoted as mode_index. Thus, IBP can be applied if (mode_index & 1) is 0, or IBP can be applied if (mode_index & 1) is 1.

In an embodiment, when a directional mode of a current block is smaller than 90 degrees or larger than 180 degrees and an adjacent reference line is used for an intra prediction, IBP can be applied together with certain delta angles. For example, when a delta angle associated with the current block is equal to a certain (or predefined) delta angle, the directional mode of the current is smaller than 90 degrees or larger than 180 degrees, and the adjacent reference line is used for the intra prediction, IBP can be applied to the current block.

In an embodiment, a delta angle determination mode can be signaled as on or off. The delta angle determination mode indicates whether Intra Bi-Prediction can be applied to directional modes with certain delta angles or whether Intra Bi-Prediction can be applied to all angles (or directional angles) smaller than 90 degrees or larger than 180 degrees. The delta angle determination mode can be signaled by a high-level syntax, such as a sequence parameter set (SPS), a picture parameter set (PPS), a frame header, a slice header, a tile header. If the delta angle determination mode is on, IBP can be applied based on certain delta angles.

In an embodiment, a pre-defined mapping table from delta angles to IBP allowance can be applied. The mapping table can include directional modes (or candidate directional modes) of a current block and delta angles (or pre-defined delta angles) corresponding to the directional modes. Each of the direction modes of the current block can correspond to a respective pre-defined delta angle. When a delta angle received from a coded bitstream is equal to the pre-defined delta angle, IBP can be applied.

In an embodiment, when a directional mode of a current block is smaller than 90 degrees or larger than 180 degrees and an adjacent reference line is used for intra prediction (e.g., the adjacent reference line includes intra prediction reference samples), Intra Bi-Prediction can be applied based on intra prediction modes of neighboring blocks of the current block. In an example, the neighboring blocks can include an above neighboring block, a left neighboring block, an above neighboring block, a bottom left neighboring block, or the like.

In an example, at least one (or two) of the neighboring blocks are coded as non-directional intra prediction modes and an adjacent reference line is used for intra prediction, Intra Bi-Prediction can be applied when a directional mode of the current block is smaller than 90 degrees or larger than 180 degrees.

In an example, when none of the neighboring blocks are coded as non-directional intra prediction modes (e.g., each of the neighboring blocks is coded as a directional intra mode) and an adjacent reference line is used for intra prediction, a single directional intra prediction is applied when the directional mode of the current block is smaller than 90 degrees or larger than 180 degrees.

In the disclosure, different angle-to-offset mapping tables can be employed for different reference lines. In each angle-to-offset mapping table, offset values that correspond to directional angles associated with a respective reference line can be provided. A prediction angle associated with the respective reference line can be determined as a sum of a directional angle and an offset value corresponding to the directional angle. Thus, different intra prediction angles can be provided for different reference lines.

In an embodiment, an angle-to-offset mapping table (e.g., the table (500) in FIG. 5) can be employed for an adjacent reference line, and another angle-to-offset mapping table can be employed for a non-adjacent reference line. In an example, as shown in FIG. 6, the adjacent reference line can be the reference line 0, and a non-adjacent reference line can be one of the reference lines 1-3. In an embodiment, an angle-to-offset mapping table can include offset values correspond to two or more entries of directional angles that are associated with different reference lines. An exemplary angle-to-offset mapping table that includes two entries of directional angles associated with two reference lines can be shown in Table 1.

TABLE 1

An angle-to-offset mapping table with multiple entries of directional angles

| offset values | directional angles for line 0 | directional angles for line 1 |
|---|---|---|
| 3 | 2 | 1 |
| 7 | 6 | 5 |
| 11 | 10 | 9 |

As shown in Table 1, a second column can include candidate directional angles 2, 6, and 10 of a current block that are associated with a reference line 0. A third column can include candidate directional angles 1, 5, and 9 of the current block that are associated with a reference line 1. A first column of the Table 1 can include offset values (or delta angles) that corresponds to the candidate directional angles in the first and second columns. An intra prediction angle can be determined as a sum of a candidate directional angle and a corresponding offset value. Thus, as shown in Table 1, different intra prediction angles can be provided for different reference lines.

It should be noted that Table 1 can also represent a first sub-table and a second sub-table. The first sub-table can include the first column and the second column. The second sub-table can include the first column and the third column. The first sub-table provides correlations between the offset values and the directional angles (or directional modes) associated with the current block and the reference line 0. The second sub-table provides correlations between the offset values and the directional angles (or directional modes) associated with the current block and the reference line 1.

In an embodiment, offset values for nominal angles (also referred to as base angles, such as in FIG. 5) can be same in an angle-to-offset mapping table for different reference lines. The base angles can be candidate directional angles of a current block associated with different reference lines. For example, as shown in Table 1, the current block can have nominal angles (or candidate directional angles) 2, 6, and 10 associated with the reference line 0, and nominal angles 1, 5, and 9 associated with the reference line 1. The nominal angle 2 for the reference line 0 and the nominal angle 1 for the reference line 1 can have a same offset value 3.

In an embodiment, differences of offset values for directional angles equal to or greater than 45 degrees in different look-up tables can be within a range, such as [Offset−D, Offset+D]. The Offset can be an offset value corresponds to an angle (or directional angle) for an adjacent reference line (e.g., reference line 0 in FIG. 6), and D can be a positive integer, such as 1, 2, 3, or 4. For example, as shown in Table 1, the Offset can be 3 that corresponds to a candidate directional angle 2 for the reference line 0 (e.g., the adjacent reference line), and D can be 4. Thus, the range can e [−1, 7]. In an example, differences of any two values in each row of a look-up table can be within a range. For example, as shown in a first row of Table 1, a difference between 3 and 2, a difference between 3 and 1, and a difference between 2 and 1 can be within a range.

In an embodiment, for a chroma block, an adjacent reference line can be used for intra prediction, but a reference line index associated with a co-located luma block can be used to determine an angle-to-offset table for the chroma block. For example, a chroma block can use a reference line 0 (e.g., an adjacent reference line) for the intra prediction. But an offset value can be determined based on an angle-to-offset table for a reference line 2, where the reference line 2 is applied to intra predict the luma block. Thus, based on a directional mode (or directional angle) of the chroma block, an offset value can be determined in the angle-to-offset table for the reference line 2.

Figure 9:
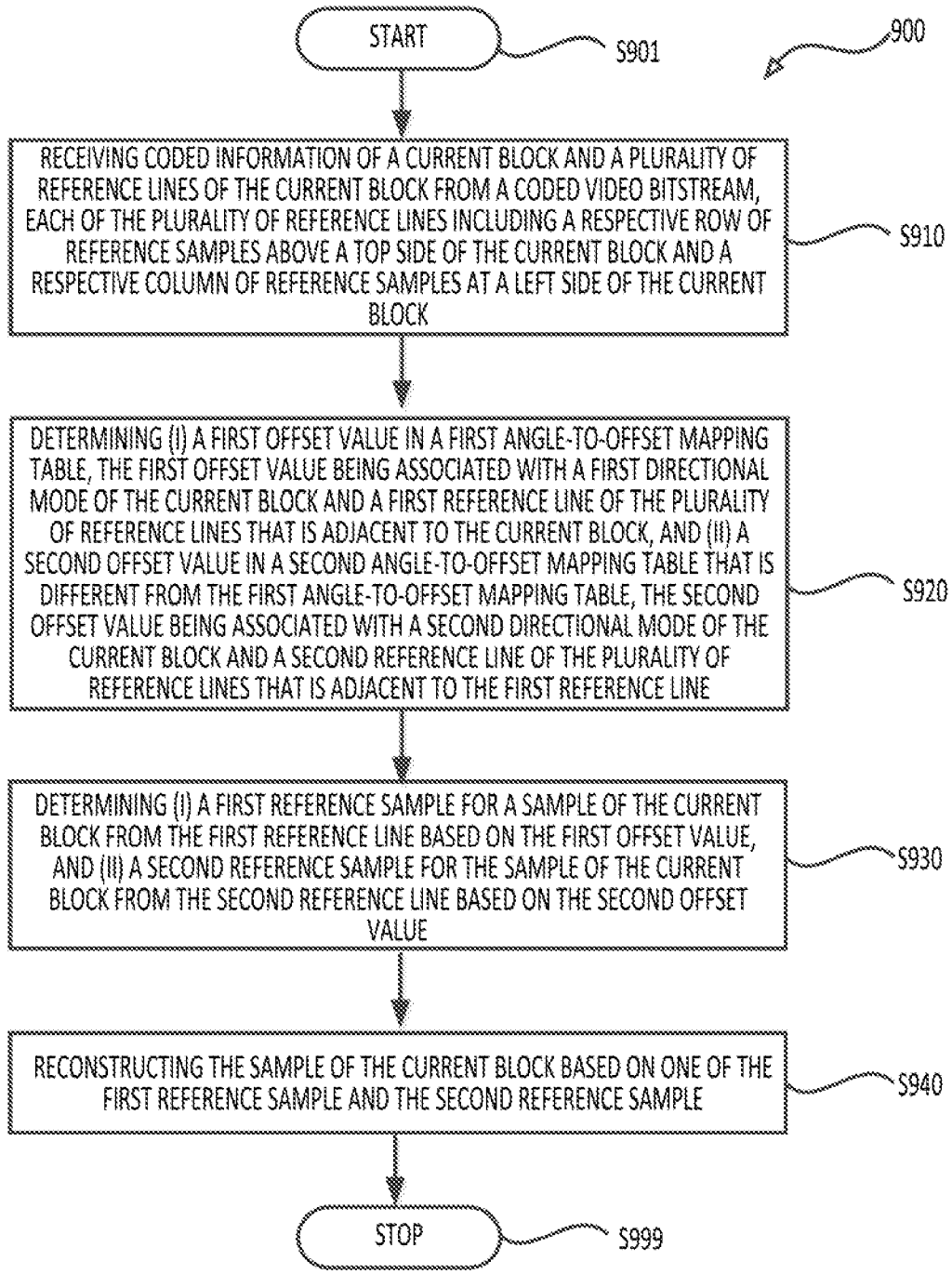
FIG. 9 shows a flow chart outlining a decoding process according to some embodiments of the disclosure.

FIG. 9 shows a flow chart outlining a process (900) according to an embodiment of the disclosure. The process (900) can be used in a video decoder. In various embodiments, the process (900) is executed by processing circuitry, such as the processing circuitry that performs functions of the video decoder (110), the processing circuitry that performs functions of the video decoder (210), and the like. In some embodiments, the process (900) is implemented in software instructions, thus when the processing circuitry executes the software instructions, the processing circuitry performs the process (900). The process starts at (S901) and proceeds to (S910).

At step (S910), coded information of a current block and a plurality of reference lines of the current block is received from a coded video bitstream. Each of the plurality of reference lines includes a respective row of reference samples above a top side of the current block and a respective column of reference samples at a left side of the current block.

At step (S920), a first offset value is determined in a first angle-to-offset mapping table. The first offset value is associated with a first directional mode of the current block and a first reference line of the plurality of reference lines that is adjacent to the current block. A second offset value is determined in a second angle-to-offset mapping table that is different from the first angle-to-offset mapping table. The second offset value is associated with a second directional mode of the current block and a second reference line of the plurality of reference lines that is adjacent to the first reference line.

At step (S930), a first reference sample for a sample of the current block is determined from the first reference line based on the first offset value. A second reference sample for the sample of the current block is determined from the second reference line based on the second offset value.

At step (S940), the sample of the current block is reconstructed based on one of the first reference sample and the second reference sample.

In an example, the first angle-to-offset mapping table indicates correlations between candidate directional modes and offset values that are associated with the current block and the first reference line. The second angle-to-offset mapping table indicates correlations between candidate directional modes and offset values that are associated with the current block and the second reference line.

In an example, the first reference sample is determined from the reference samples of the first reference line based on a first directional angle. The first directional angle is equal to a sum of a first directional mode of the current block and the first offset value. The second reference sample is determined from the reference samples of the second reference line based on a second directional angle. The second directional angle is equal to a sum of a second directional mode of the current block and the second offset value.

In an example, based on the first directional mode and the second directional mode of the current block being larger than 45 degrees, a difference of the first offset value and the second offset value is within a preset range.

In some embodiments, the first directional mode associated with the current block and the first reference line, and the second directional mode associated with the current block and the second reference line correspond to a same offset value.

In an embodiment, a first difference between the first directional mode and the same offset value, a second difference between the second directional mode and the same offset value, and a third difference between the first directional mode and the second directional mode are within a predefined range.

In an embodiment, an offset value for a chroma component of the current block is determined based on a reference line of the plurality of reference lines that is associated with a luma component of the current block.

In an example, the predefined range is equal to or larger than the first offset value minus a constant value, and equal to or smaller than the first offset value plus the constant value.

In an example, the constant value is one of 1, 2, 3, or 4.

Then, the process proceeds to (S999) and terminates.

The process (900) can be suitably adapted. Step(s) in the process (900) can be modified and/or omitted. Additional step(s) can be added. Any suitable order of implementation can be used.

Figure 10:
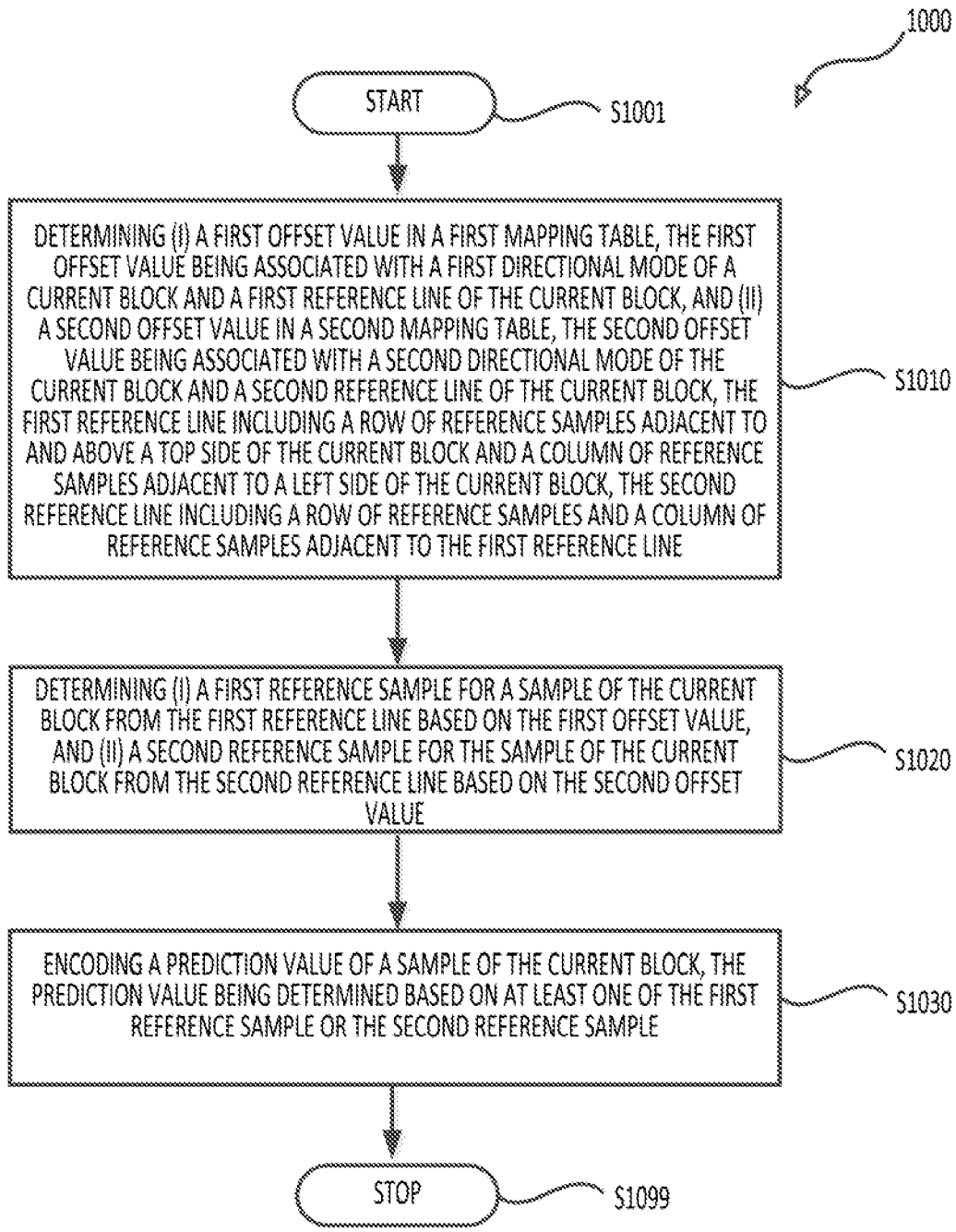
FIG. 10 shows a flow chart outlining an encoding process according to some embodiments of the disclosure.

FIG. 10 shows a flow chart outlining a process (1000) according to an embodiment of the disclosure. The process (1000) can be used in a video encoder. In various embodiments, the process (1000) is executed by processing circuitry, such as the processing circuitry that performs functions of the video encoder (103), the processing circuitry that performs functions of the video encoder (303), and the like. In some embodiments, the process (1000) is implemented in software instructions, thus when the processing circuitry executes the software instructions, the processing circuitry performs the process (1000). The process starts at (S1001) and proceeds to (S1010).

At (S1010), a first offset value in a first mapping table is determined. The first offset value is associated with a first directional mode of a current block and a first reference line of the current block. A second offset value in a second mapping table is determined. The second offset value is associated with a second directional mode of the current block and a second reference line of the current block. The first reference line includes a row of reference samples adjacent to and above a top side of the current block and a column of reference samples adjacent to a left side of the current block. The second reference line includes a row of reference samples and a column of reference samples adjacent to the first reference line.

At (S1020), a first reference sample is determined for a sample of the current block from the first reference line based on the first offset value. A second reference sample is determined for the sample of the current block from the second reference line based on the second offset value.

At (S1030), a prediction value of a sample of the current block is encoded, where the prediction value is determined based on at least one of the first reference sample or the second reference sample.

Then, the process proceeds to (S1099) and terminates.

The process (1000) can be suitably adapted. Step(s) in the process (1000) can be modified and/or omitted. Additional step(s) can be added. Any suitable order of implementation can be used.

The techniques described above, can be implemented as computer software using computer-readable instructions and physically stored in one or more computer-readable media. For example, FIG. 11 shows a computer system (1100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
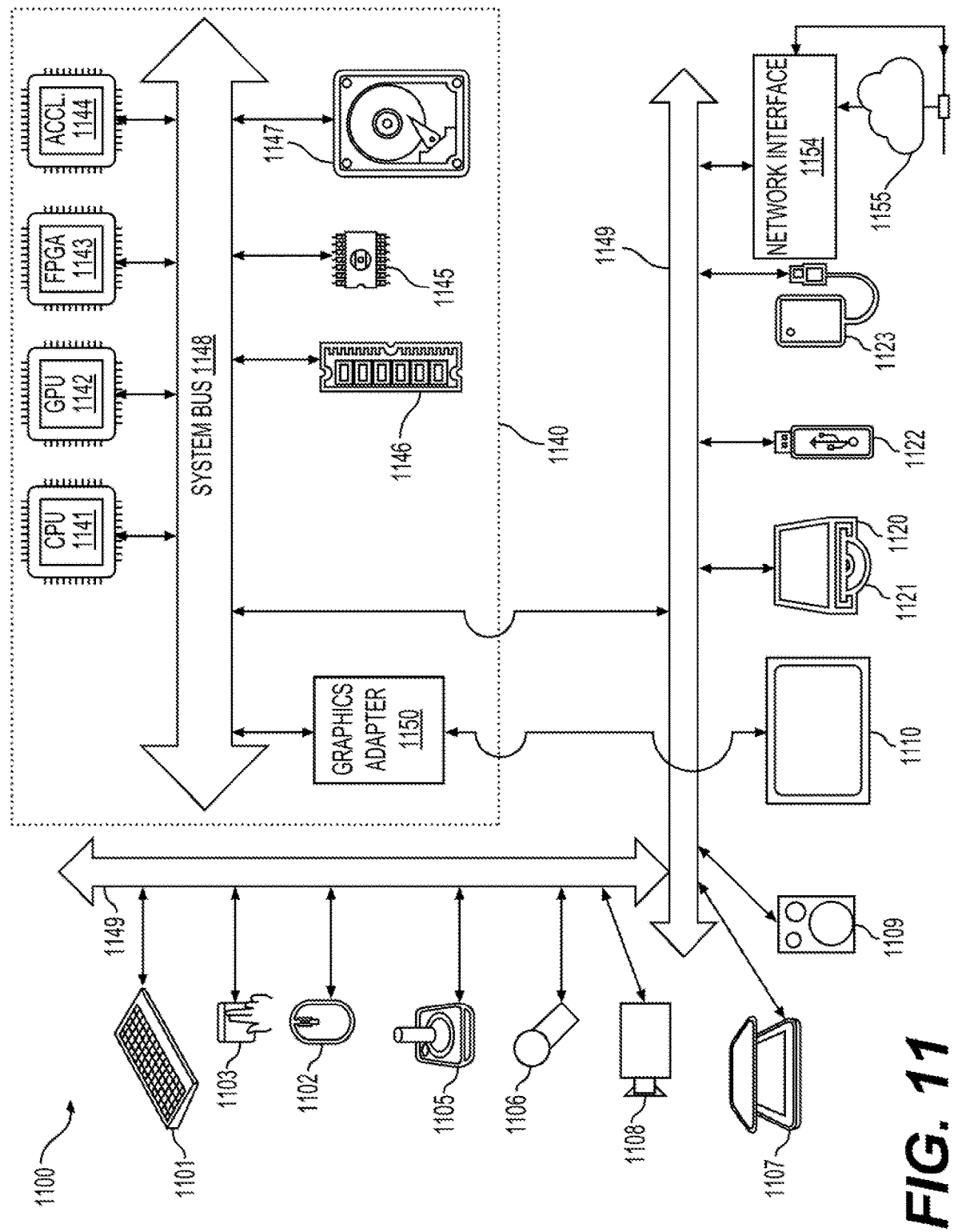
FIG. 11 is a schematic illustration of a computer system in accordance with an embodiment.

The components shown in FIG. 11 for computer system (1100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), graphics adapters (1150), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the screen (1110) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding performed in a video decoder, the method comprising:
   receiving coded information of a current block and a plurality of reference lines of the current block from a coded video bitstream, each of the plurality of reference lines including a respective row of reference samples above a top side of the current block and a respective column of reference samples at a left side of the current block;
   determining (i) a first offset value in an angle-to-offset mapping table and (ii) a second offset value in the angle-to-offset mapping table, the first offset value being associated with a first directional mode for a first reference line of the plurality of reference lines and a second directional mode for a second reference line of the plurality of reference lines, the first reference line being adjacent to the current block and the second reference line being adjacent to the first reference line, the second offset value being associated with the first directional mode for the first reference line of the plurality of reference lines and the second directional mode for the second reference line of the plurality of reference lines;
   determining (i) a first reference sample for a sample of the current block from the first reference line based on the first offset value, and (ii) a second reference sample for the sample of the current block from the second reference line based on the second offset value; and
   reconstructing the sample of the current block based on one of the first reference sample and the second reference sample.

2. The method of claim 1, wherein:
   the angle-to-offset mapping table indicates correlations between candidate directional modes and offset values that are associated with the current block and the first reference line, and
   the angle-to-offset mapping table indicates correlations between candidate directional modes and offset values that are associated with the current block and the second reference line.

3. The method of claim 2, wherein the first directional mode associated with the current block and the first reference line, and the second directional mode associated with the current block and the second reference line correspond to the first offset value.

4. The method of claim 3, wherein a first difference between the first directional mode and the first offset value, a second difference between the second directional mode and the first offset value, and a third difference between the first directional mode and the second directional mode are within a predefined range.

5. The method of claim 4, wherein the predefined range is equal to or larger than the first offset value minus a constant value, and equal to or smaller than the first offset value plus the constant value.

6. The method of claim 5, wherein the constant value is one of 1, 2, 3, or 4.

7. The method of claim 1, wherein the determining the first reference sample and the second reference sample further comprising:
   determining the first reference sample from the reference samples of the first reference line based on a first directional angle, the first directional angle being equal to a sum of the first directional mode of the current block and the first offset value; and
   determining the second reference sample from the reference samples of the second reference line based on a second directional angle, the second directional angle being equal to a sum of the second directional mode of the current block and the second offset value.

8. The method of claim 1, wherein:
   when the first directional mode and the second directional mode of the current block are larger than 45 degrees, a difference of the first offset value and the second offset value is within a preset range.

9. The method of claim 1, wherein an offset value for a chroma component of the current block is determined based on a reference line of the plurality of reference lines that is associated with a luma component of the current block.

10. An apparatus of video decoding, the apparatus comprising:
    processing circuitry configured to:
    receive coded information of a current block and a plurality of reference lines of the current block from a coded video bitstream, each of the plurality of reference lines including a respective row of reference samples above a top side of the current block and a respective column of reference samples at a left side of the current block;
    determine (i) a first offset value in an angle-to-offset mapping table and (ii) a second offset value in the angle-to-offset mapping table, the first offset value being associated with a first directional mode for a first reference line of the plurality of reference lines and a second directional mode for a second reference line of the plurality of reference lines, the first reference line being adjacent to the current block and the second reference line is adjacent to the first reference line, and the second offset value being associated with the first directional mode for the first reference line of the plurality of reference lines and the second directional mode for the second reference line of the plurality of reference lines;
    determine (i) a first reference sample for a sample of the current block from the first reference line based on the first offset value, and (ii) a second reference sample for the sample of the current block from the second reference line based on the second offset value; and reconstruct the sample of the current block based on one of the first reference sample and the second reference sample.

11. The apparatus of claim 10, wherein:
the angle-to-offset mapping table indicates correlations between candidate directional modes and offset values that are associated with the current block and the first reference line, and
the angle-to-offset mapping table indicates correlations between candidate directional modes and offset values that are associated with the current block and the second reference line.

12. The apparatus of claim 11, wherein the first directional mode associated with the current block and the first reference line and the second directional mode associated with the current block and the second reference line correspond to a same the first offset value.

13. The apparatus of claim 12, wherein a first difference between the first directional mode and the first offset value, a second difference between the second directional mode and the first offset value, and a third difference between the first directional mode and the second directional mode are within a predefined range.

14. The apparatus of claim 13, wherein the predefined range is equal to or larger than the first offset value minus a constant value, and equal to or smaller than the first offset value plus the constant value.

15. The apparatus of claim 14, wherein the constant value is one of 1, 2, 3, or 4.

16. The apparatus of claim 10, wherein the processing circuitry is further configured to:
determine the first reference sample from the reference samples of the first reference line based on a first directional angle, the first directional angle being equal to a sum of the first directional mode of the current block and the first offset value; and
determine the second reference sample from the reference samples of the second reference line based on a second directional angle, the second directional angle being equal to a sum of the second directional mode of the current block and the second offset value.

17. The apparatus of claim 10, wherein:
when the first directional mode and the second directional mode of the current block are larger than 45 degrees,
a difference of the first offset value and the second offset value is within a preset range.

18. The apparatus of claim 10, wherein an offset value for a chroma component of the current block is determined based on a reference line of the plurality of reference lines that is associated with a luma component of the current block.

19. A method of processing visual media data, the method comprising:
processing a bitstream that includes the visual media data according to a format rule, wherein
the bitstream includes coded information of a current block and a plurality of reference lines of the current block, each of the plurality of reference lines including a respective row of reference samples above a top side of the current block and a respective column of reference samples at a left side of the current block; and
the format rule specifies that:
(i) a first offset value in an angle-to-offset mapping table and (ii) a second offset value in the angle-to-offset mapping table are determined, the first offset value being associated with a first directional mode for a first reference line of the plurality of reference lines and a second directional mode for a second reference line of the plurality of reference lines, the first reference line being adjacent to the current block and the second reference line being adjacent to the first reference line, the second offset value being associated with the first directional mode for the first reference line of the plurality of reference lines and the second directional mode for the second reference line of the plurality of reference lines;
(i) a first reference sample for a sample of the current block from the first reference line is determined based on the first offset value, and (ii) a second reference sample for the sample of the current block from the second reference line is determined based on the second offset value; and
the sample of the current block is processed based on one of the first reference sample and the second reference sample.

20. The method of claim 19, wherein:
the angle-to-offset mapping table indicates correlations between candidate directional modes and offset values that are associated with the current block and the first reference line, and
the angle-to-offset mapping table indicates correlations between candidate directional modes and offset values that are associated with the current block and the second reference line.

* * * * *